United States Patent [19]

King

[11] 4,230,374

[45] Oct. 28, 1980

[54] BRAKE CONTROL APPARATUS FOR RAILWAY CARS

[76] Inventor: William R. King, 1909 Sunshine Sq., Longview, Tex. 75601

[21] Appl. No.: 924,068

[22] Filed: Jul. 12, 1978

Related U.S. Application Data

[63] Continuation of Ser. No. 775,379, Mar. 7, 1977, Pat. No. 4,143,923.

[51] Int. Cl.³ ............................................. B60T 8/18
[52] U.S. Cl. ................................. 303/22 R; 188/195; 303/23 R
[58] Field of Search .................... 188/195; 303/28, 36, 303/37, 38, 82, 22 R, 22 A, 23 R, 6 M, 69

[56] References Cited

U.S. PATENT DOCUMENTS

| | | |
|---|---|---|
| 345,820 | 7/1886 | Westinghouse . |
| 413,253 | 10/1889 | Heberkorn . |
| 563,934 | 7/1896 | Luyers . |
| 720,828 | 2/1903 | Mann . |
| 778,044 | 12/1904 | Kent . |
| 831,040 | 9/1906 | Custer . |
| 950,642 | 3/1910 | Smith . |
| 1,091,596 | 3/1914 | Snyder . |
| 1,230,949 | 6/1917 | Turner et al. . |
| 1,486,872 | 3/1924 | Farmer . |
| 1,602,108 | 10/1926 | Haskell . |
| 1,878,993 | 9/1932 | Anderberg et al. . |
| 2,077,922 | 4/1937 | Farmer . |
| 2,098,129 | 11/1937 | Bell ................................. 303/22 R |
| 2,109,366 | 2/1938 | Cook et al. . |
| 2,160,210 | 5/1939 | Canetta et al. . |
| 2,364,927 | 12/1944 | Sudduth . |
| 2,528,143 | 10/1950 | Hewitt . |
| 3,125,379 | 3/1964 | Valentine . |
| 3,228,731 | 1/1966 | Valentine . |
| 3,330,604 | 7/1967 | Schultz et al. . |
| 3,338,638 | 8/1967 | Kirk et al. . |
| 3,338,639 | 8/1967 | Carothers . |
| 3,341,257 | 9/1967 | Weber . |
| 3,376,080 | 4/1968 | Kettering et al. . |
| 3,460,870 | 8/1969 | Kirk . |
| 3,606,485 | 9/1971 | Scott . |
| 3,690,420 | 9/1972 | Natschke . |
| 3,727,994 | 4/1973 | Keller . |
| 3,730,597 | 5/1973 | Rickert ............................. 303/22 A |
| 3,814,483 | 6/1974 | Coiner et al. . |
| 3,883,188 | 5/1975 | Wickham . |

OTHER PUBLICATIONS

Harding, Freight-Car Brake Equipment, International Textbooks Co. (1946), pp. 1-12, 40-42 and figures.
Missouri Pacific Railway Company, Maintenance and Operation of Air and Dynamic Brakes Manual, 1967, pp. 3-7, 16-23, 50-55.

Primary Examiner—George E. A. Halvosa
Attorney, Agent, or Firm—Richards, Harris & Medlock

[57] ABSTRACT

A brake control apparatus for railway cars having sprung and unsprung portions is interposed between a brake pressure supply line and a brake cylinder line. A first chamber is connected to the brake pressure supply line and a second chamber is connected to the brake cylinder line. The chambers are abutted by surfaces having different cross-sectional areas of a diaphragm which is biased. A first valve responsive to positioning of the diaphragm, and a second valve responsive to positioning of a strut in a strut cylinder, effect first and second predetermined relationships between pressure drop in the brake pressure supply line and pressure drop in the brake cylinder line. The strut cylinder, mounted between the sprung and unsprung portions of the railway car, may be adapted to sense partially loaded as well as fully loaded or unloaded conditions.

3 Claims, 6 Drawing Figures

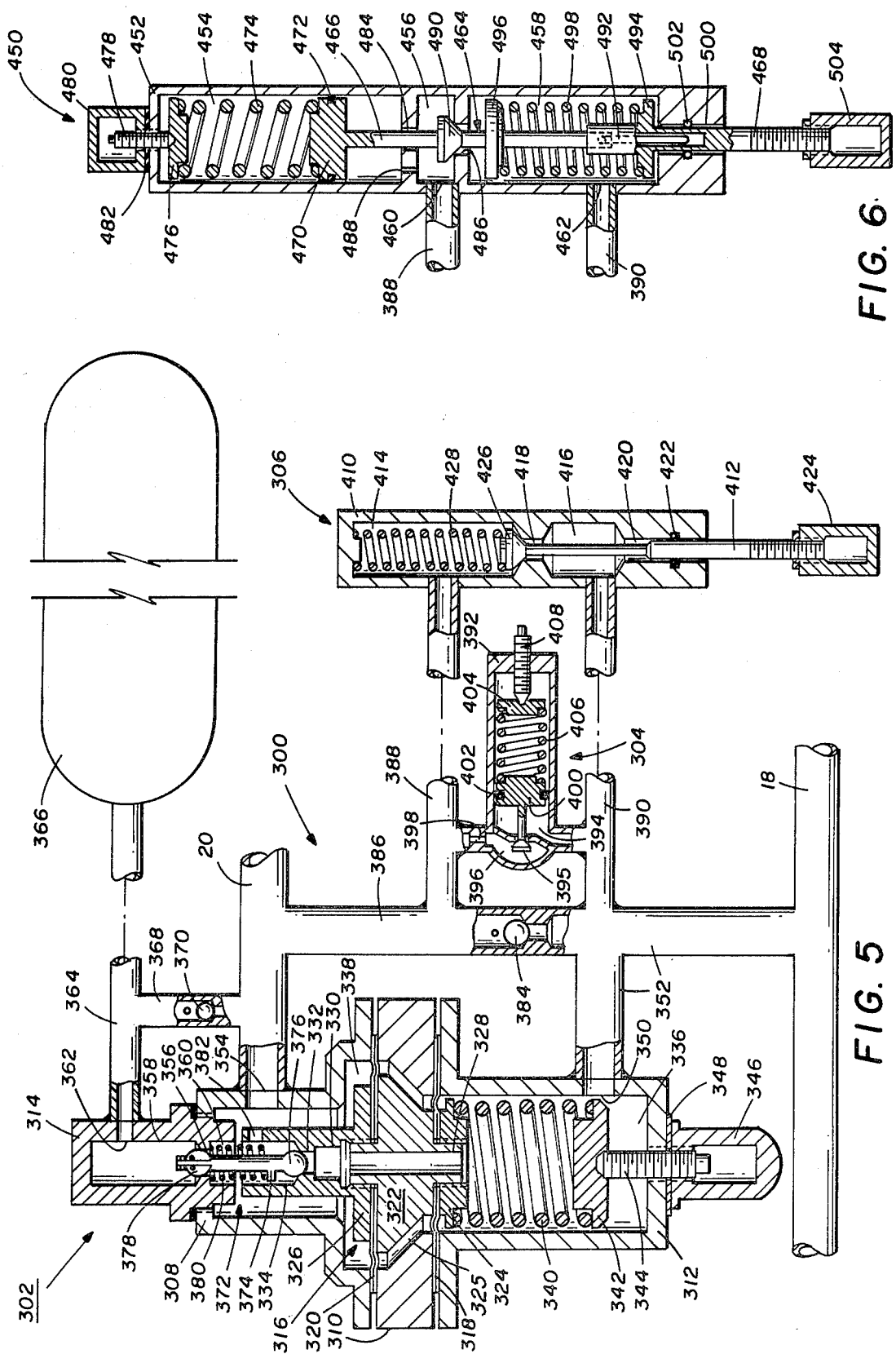

BRAKE CONTROL APPARATUS FOR RAILWAY CARS

CROSS REFERENCE TO RELATED APPLICATION

This application is a continuation of co-pending application Ser. No. 775,379, filed Mar. 7, 1977, now U.S. Pat. No. 4,143,923.

BACKGROUND AND SUMMARY OF THE INVENTION

This invention relates generally to brake control devices, and more particularly to a brake control apparatus responsive to loading conditions of railway cars.

One of the successful brake control devices for railway cars has been the well-known AB freight brake control device. However, the AB brake control is a single capacity device which applies a given brake signal to each car of a train without regard to the loading of the car. The undesirable result in a train comprised of loaded and unloaded cars is a shock or buffer effect which occurs because of inadequate braking on the loaded cars and excessive braking on the unloaded cars. Thus, a need exists for a brake control device for railway cars which applies the brakes of each individual car in accordance with the loading conditions thereof.

Many types of brake control apparatus have been heretofore known and used for automatically reducing the degree of braking on railway cars carrying a light load and thereby avoiding excessive braking on the wheels of relatively lightly loaded cars. Previous types of double capacity brake control apparatus usually comprise a so-called change-over valve device and strut cylinder for measuring the degree of load carried by a railway car according to the relative positioning of sprung and unsprung portions of the railway car undercarriage. These prior devices, sometimes referred to as empty and load brake control apparatus, have generally been relatively complicated in nature and high in cost.

Furthermore, most of the heretofore known empty and load brake control apparatus for railway cars are changed over to provide either empty or load braking, accordingly as the vehicle is empty or loaded, only while the train brake pipe pressure is increasing subsequent to a brake pipe pressure reduction to substantially zero, a condition obtained under emergency brake application and not during a full or partial service brake application.

Recognizing that railway cars are often operated partially loaded, as well as fully loaded or fully unloaded, it is the general purpose of this invention to provide brake control apparatus for railway cars which is responsive to the degree of loading in each individual car to effect proficient brake application in loaded, unloaded and partially loaded railway cars, thereby preventing the undesirable buffer effect along the train caused by uneven brake application, and which continuously senses the condition of loading during emergency and service brake application.

Another purpose of the invention is to provide brake control apparatus which may readily and economically be combined with existing railway brake valve devices, such as for instance the widely used AB brake valve, without requiring changes in train operating procedure. The invention functions equally well whether the train brakes are applied by a single pressure reduction, or more typically, by staged pressure reductions.

More specifically, the present invention comprises a brake control valve interposed between a brake pipe and a brake cylinder line. The control valve includes a moveable diaphragm assembly suspended therein which separates two chambers connected to the brake pressure pipe and the brake cylinder line, respectively. The diaphragm is responsive to load sensing strut cylinder mounted between the sprung and unsprung portions of the railway car undercarriage to actuate other valves within the control valve in order to effect a relatively reduced braking signal for an unloaded railway car with respect to the braking signal for a loaded railway car.

A given brake pipe signal may be either reduced to effect brake actuation on an unloaded railway car, or increased to effect brake actuation on a loaded railway car. In the former case, a limiting valve may be provided between the control valve and the strut cylinder of the apparatus to prevent pressure reduction below a predetermined safety level. In the latter case, a limiting valve may be provided across the strut cylinder and the control valve of the invention to allow, under emergency conditions, the brakes of unloaded railway cars to be actuated to be the same degree as the brakes of loaded railway cars. In both cases, the strut cylinder may be adapted to sense the degree of railway car loading, thereby enabling the apparatus to initially effect brake actuation on a partially loaded railway car as though the car were fully loaded, with final actuation effected at a lower value as though the car were unloaded. Also in the latter case, there may be provided an emergency pressure source, if desired.

DESCRIPTION OF THE DRAWINGS

A more complete understanding of the invention may be had by reference to the following Detailed Description when taken in conjunction with the accompanying Drawings, wherein:

FIG. 5 is a vertical cross-sectional view of a brake control apparatus for railway cars incorporating a second embodiment of the invention; and FIG. 6 is an enlarged vertical cross-sectional view of a first modification of the brake control apparatus of FIG. 5.

DETAILED DESCRIPTION OF THE INVENTION

Figure 1:
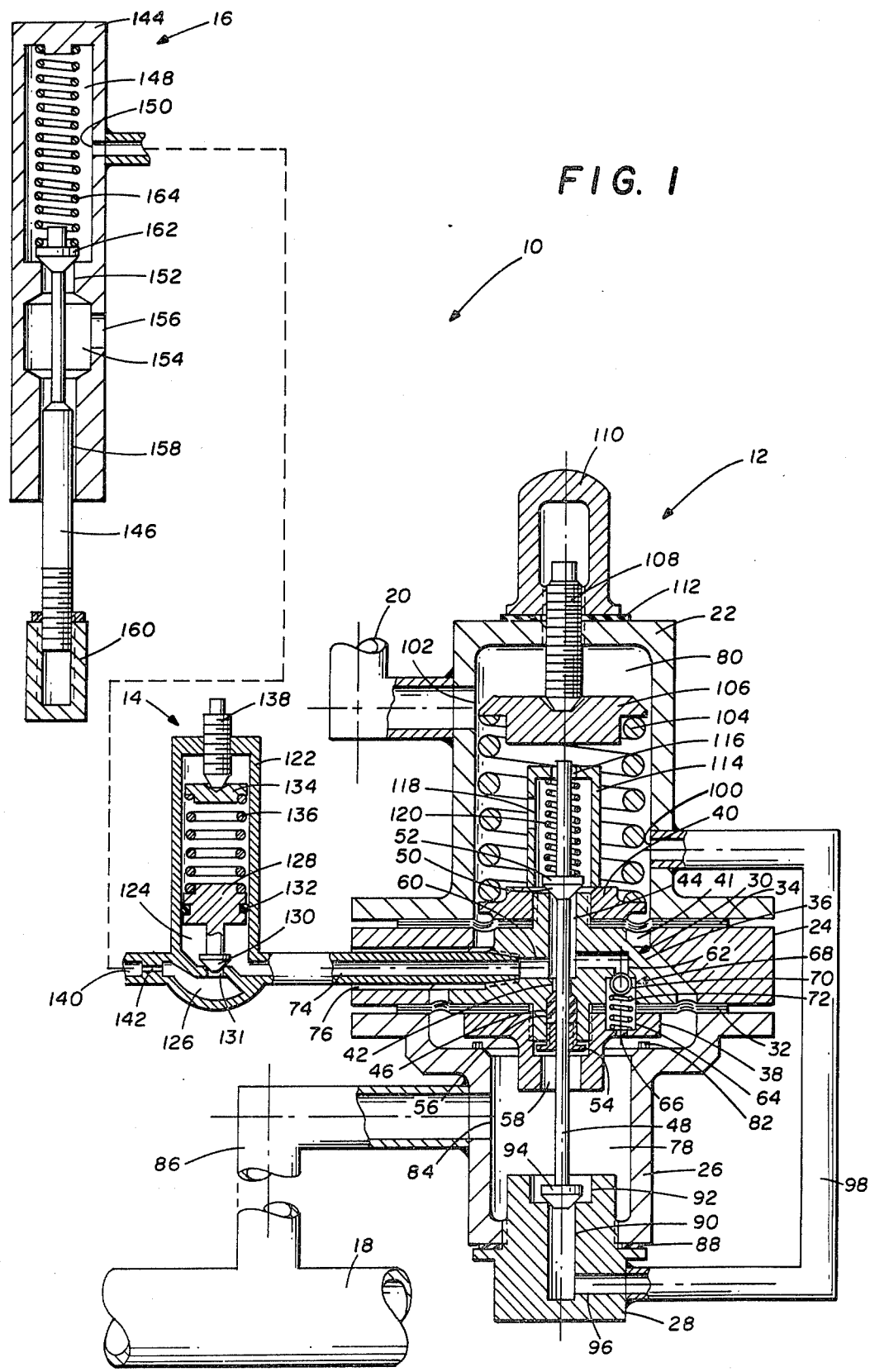
FIG. 1 is a vertical cross-sectional view of a brake control apparatus for railway cars incorporating a first embodiment of the invention.

Referring now to the Drawings, and particularly to FIG. 1 thereof, there is shown a brake control apparatus for railway cars 10 incorporating the invention. The brake control apparatus 10 comprises a control valve 12, a pressure limiting valve 14 and a strut cylinder 16. Brake control apparatus 10 is interposed between a brake pipe 18 and a brake cylinder line 20. Brake pipe 18 runs along the entire length of the train of railway cars and is connected to a remote source of fluid under pressure (not shown) by means of a brake application valve (not shown). The brake cylinder line 20 serves to connect the brake control apparatus 10 with a conventional brake cylinder (not shown).

Control valve 12 is of sectionalized casting construction, consisting of an upper casing section 22, intermediate casing section 24 and lower casing section 26. Casing sections 22, 24 and 26 are attached one to another. Plug member 28 is threadedly engaged through the bottom end of lower casing section 26.

Disposed within the control valve 12 is diaphragm assembly 30. Diaphragm assembly 30 includes a pair of spaced diaphragms, 32 and 34. The outer periphery of the first diaphragm 32 is clamped between the lower face of intermediate casing section 24 and the upper face of lower casing section 26. Similarly, the outer periphery of second diaphragm 34 is clamped between the lower face of upper casing section 22 and the upper face of intermediate casing section 24.

The inner peripheries of diaphragms 32 and 34 are secured within diaphragm assembly 30. The inner periphery of first diaphragm 32 is clamped between the lower face of diaphragm follower 36 and the upper face of lower diaphragm nut 38 which threadedly engages a downwardly protruding threaded portion of diaphragm follower 36. In a similar manner, the upper face of diaphragm follower 36 includes an upwardly protruding threaded portion on which is threadedly engaged upper diaphragm nut 40. Hence, the inner periphery of second diaphragm 34 is securely clamped between the lower face of upper diaphragm nut 40 and the upper face of diaphragm follower 36. Thus it is seen that diaphragms 32 and 34 flexibly suspend diaphragm assembly 30 for limited axial translation within the sloped annular space 41 between diaphragm assembly 30 and intermediate casing section 24.

Diaphragm follower 36 includes a bore 42 positioned coaxially intermediate upper counterbore 44 and lower counterbore 46. Slidably disposed within bore 42, and extending through counterbores 44 and 46, is valve stem 48. Upper counterbore 44 extends upwardly from bore 42 and terminates in a valve seat 50 located in the end surface of the upper threaded protrusion of diaphragm follower 30. Valve seat 50 serves to receive valve member 52, which is rigidly secured to valve stem 48 at a point below the upper end thereof. Lower counterbore 46 extends downwardly from bore 42, terminating at the end of the lower threaded protrusion of diaphragm follower 36. A packing nut 54, through which valve stem 48 is slidably received, threadedly engages the outer portion of lower counterbore 46 to compress and retain packing material 56 therein. As a means of preventing undesirable pressure losses due to accidental displacement of packing material 56 caused by the disengagement of packing nut 54 during service, lower diaphragm nut 38 includes a coaxial bore 58 having an inside diameter less than the outside diameter of the collar of packing nut 54. As a result, lower diaphragm nut 38 serves both to retain packing nut 54 and to prevent its complete disengagement from counterbore 46. Therefore, it will be seen that valve stem 48, which is slidably disposed in bore 42 as well as packing nut 54, extends completely through diaphragm assembly 30.

Also included in diaphragm follower 36 of diaphragm assembly 30 are left and right cross bores, 60 and 62, respectively, both of which open into counterbore 44 at their interior ends. Right cross bore 62 serves to communicate upper counterbore 44 with a cavity 64 formed between diaphragm follower 36, first diaphragm 32 and lower diaphragm nut 38. Port 66 connects cavity 64 in turn through the outer surface of lower diaphragm nut 38. A check valve 68 comprising a spherical member 70 biased against the entrance of right cross bore 62 onto cavity 64 by spring 72 functions to close off cavity 64 from upper counterbore 44 under certain conditions. Left cross bore 60, on the other hand, unites upper counterbore 44 with conduit 74, one end of which is secured to diaphragm follower 36. The other end of conduit 74 leads to limiting valve 14 through an opening 76 in intermediate casing section 24 of control valve 12. Opening 76 is sufficiently large to permit translative movement of conduit 74 simultaneously with movable diaphragm assembly 30, to which it is attached.

Still having reference to FIG. 1, diaphragm assembly 30, by virtue of its position within control valve 12 separates the interior volume thereof into two chambers, 78 and 80. Pressure supply chamber 78 is defined by the lower surface of diaphragm assembly 30, in conjunction with lower casing section 26 and plug member 28. The effective area of diaphragm assembly 30 abutting pressure supply chamber 78 is thus the area across the enlarged mouth of lower casing section 26. Stops 82 are provided around the horizontal rim of lower casing section 26 to limit downward displacement of diaphragm assembly 30, as well as to prevent pressure tight engagement between lower diaphragm nut 38 and the inner rim of lower casing section 26. A port 84 within the wall of lower casing section 26 opens into a conduit 86 which connects with brake pipe 18. Consequently, fluid communication is directly established between pressure supply chamber 78 and brake pipe 18.

Located at the bottom end of pressure supply chamber 78, plug member 28 is threadedly engaged through the end of lower casing section 26. An annular gasket 88 is provided for clamping, sealing engagement between the exterior end of lower casing section 26 and the collar of plug member 28 to preclude leakage of fluid under pressure from chamber 78 to atmosphere.

Plug member 28 includes substantially centrally located bore 90 and coaxial counterbore 92, whose intersection forms a valve seat to receive valve member 94. Extending downward from its slidable connection in diaphragm assembly 30 is valve stem 48, the end of which is attached to the valve member 94 that seats in plug member 28. Bore 90 connects counterbore 92 opening onto pressure supply chamber 78 with one end of cross bore 96. The other end of cross bore 96 leads to conduit 98 which is attached to a bore 100 positioned in upper casing section 22. Accordingly, it will be appreciated that fluid communication may be established via conduit 98 between pressure supply chamber 78 and control chamber 80 subject to the action of valve 94.

Control chamber 80 is defined as that volume existing between the end of upper casing section 22 and the movable abutment formed by the top end of diaphragm assembly 30. It will be noted that the effective area of the upper end of diaphragm assembly 30 abutting control chamber 80 is less than the effective area of the lower end of diaphragm assembly 30 abutting pressure supply chamber 78. Port 102 located in the wall of upper casing section 22 allows for direct fluid communication between control chamber 80 and a brake cylinder (not shown) via brake line 20. Coil spring 104 is disposed within control chamber 80 intermediate upper diaphragm nut 40 and spring follower 106. The spring follower 106 has a depression in its upper surface for receiving and centering spring adjusting screw 108, which is threadedly mounted substantially centrally through the upper casing section 22. Thus, by means of spring adjusting screw 108, the downward biasing force of spring 104 against diaphragm assembly 30 may be set to a predetermined value and/or adjusted form the outside of control valve 12 without disassembly thereof. A protective jam nut 110 threadedly engages the exterior protruding end of spring adjusting screw 108 to lock it in any desired position. Gasket 112, placed between jam nut 110 and the exterior of upper casing section 22, forms a seal to prevent leakage of fluid pressure from control chamber 80 to atmosphere.

Disposed within coil spring 104 and attached to the top surface of upper diaphragm nut 40 is guide 114. Aperture 116 in the top end of guide 114 serves to receive and guide the uppermost portion of valve stem 48. Control chamber 80 fluidly communicates with the interior of guide 114 through port 118. A spring 120, disposed in surrounding relationship to valve stem 48 between valve member 52 and the inside end of guide 114, biases valve stem 48 downward relative to diaphragm assembly 30. As a consequence, fluid communication may be established between control chamber 80 and upper counter bore 44 in diaphragm assembly 30 subject to the action of valve 52.

Pressure limiting valve 14 includes a body 122 having a first chamber 124 and a second chamber 126. Slidably disposed within first chamber 124 is a piston 128, from the bottom face of which extends a valve member 130. Valve 130 serves to open or close passage 131 joining chambers 124 and 126. First chamber 124 connects to a passageway defined by conduit 74, which leads to cross bore 60 in diaphragm assembly 30.

Piston 128, slidably positioned within first chamber 124, has a peripheral annular groove in which is disposed an O-ring 132. O-ring 132 forms a sliding seal between piston 128 and the interior surface of body 122 so as to prevent leakage or fluid pressure from the lower portion of first chamber 124 to the upper portion thereof. Positioned in the upper portion of first chamber 124, intermediate the top of piston 128 and spring follower 134, is spring 136. Spring 136 is biased to counteract the force generated by the pressure in the lower portion of first chamber 124 acting against the bottom face of piston 128. The force exerted by spring 136 may be preset or adjusted by means of spring adjusting screw 138. Spring adjusting screw 138 is threadedly mounted through the top end of body 122 and contacts spring follower 134. Consequently, it will be understood that conduit 74 may fluidly communicate through first chamber 124 and passage 131 with second chamber 126 subject to the action of valve 130.

Second chamber 126 opens to a passage way 140 via choke 142, which functions to restrict the rate of fluid flow between passageway 140 and second chamber 126. The other end of passageway 140 leads to strut cylinder 16.

Strut cylinder 16 includes a body 144 in which is diposed an extending strut 146. Body 144 includes a top chamber 148. A port 150 in the wall of body 144 connects top chamber 148 with passageway 140. Therefore, top chamber 148 of strut cylinder 16 is in fluid communication with second chamber 126 of pressure limiting valve 14. Bore 152 joins top chamber 148 with bottom chamber 154, which opens to atmosphere via port 156. Lower bore 158, which is coaxial with bore 152, slidably engages and guides strut 146 for translation within body 144. The bottom end of strut 146 is reduced and threaded to receive a contact nut 160. A valve body 162 is located in top chamber 148 and is attached near the reduced top end of strut 146. A spring 164 interposed between the end of top chamber 148 and valve body 162 urges strut 146 downwardly, which moves valve 162 to a closed position. Preferably, contact nut 160 should be adjusted so that valve 162 is open when the car is loaded at between 40% and 60% capacity. Accordingly, subject to the position of valve 162, passageway 140 may be either closed or open to chamber 148 and 154, and thus to atmosphere.

Figure 4:
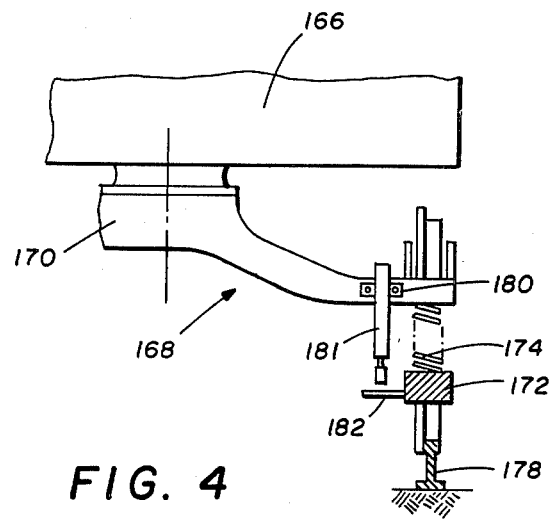
FIG. 4 is a portion of an end view of a railway car undercarriage taken along the line 4—4 of FIG. 3 and showing a load sensing strut cylinder mounted on a bolster.
Figure 3:
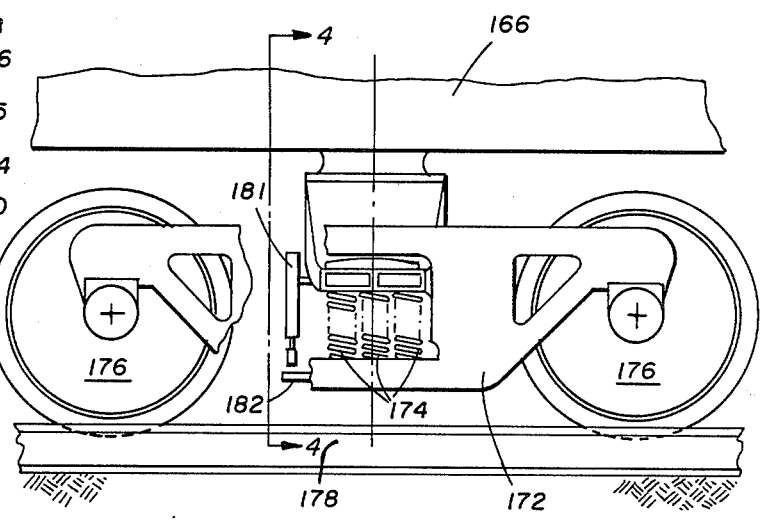
FIG. 3 is a side view of a railway car undercarriage in which certain parts have been broken away more clearly to illustrate the placement of a load sensing strut cylinder on the bolster.

Turning momentarily to FIGS. 3 and 4 in conjunction with FIG. 1, there is shown a typical location for a strut cylinder 181 which may be similar to strut cylinder 16. Railway car 166 is supported atop an undercarriage 168. Undercarriage 168 comprises a transverse truck bolster 170 which supports side truck frames 172. Side truck frames 172 are resiliently attached to truck bolster 170 by means of springs 174. Rotatably supported on side truck frames 172 are wheels 176, which rollingly contact underlying railroad track 178. Strut cylinder 181 is mounted substantially vertically on truck bolster 170, as for instance with bracket 180. Projecting stop 182 secured to truck side frame 172 extends substantially horizontally beneath the strut cylinder 181. The strut cylinder 181 is thus mounted on a sprung portion of the undercarriage while its stop 182 is mounted on an unsprung portion of the undercarriage 168. Since various loadings in railway car 166 cause corresponding deflections in spring 174 and hence relative displacement between sprung and unsprung portions of undercarriage 168, the condition of loading is sensed by strut cylinder 181.

The parts of the brake control apparatus 10 illustrated in FIG. 1 and so far described function as follows. Prior to charging the train brake system for operation, it will be understood that all cavities and conduits within brake control apparatus 10 are at or near zero gauge pressure. With no pressure in pressure supply chamber 78 to counteract the downward force of spring 104, diaphragm assembly 30 rests in a down position against stops 82. Diaphragm assembly 30 thus displaced downward, valve 94 is closed while valve 52 is open to permit fluid communication from upper counterbore 44 through guide 114 and port 118 to control chamber 80.

In initially charging the automatic brake control apparatus 10, a remote source of fluid under pressure (not shown) supplies pressurized fluid to brake pipe 18. Pressurized fluid flows from brake pipe 18 through conduit 86 to supply chamber 78 of control valve 12. As the pressure builds within supply chamber 78, the resultant upward force on diaphragm assembly 30 overcomes the opposing force of spring 104, moving diaphragm assembly 30 upward. The upward shift of diaphragm assembly 30 causes valve seat 50 to engage valve 52, thereby closing communication between upper counterbore 44 and brake control chamber 80. Further pressure rise in supply chamber 78 pushes diaphragm assembly 30 and thus valve stem 48 upward beyond the generally central position where valve 52 was closed. Since valves 94 and 52 are both rigidly fixed to valve stem 48, valve 94 is therefore pulled open allowing pressurized fluid to enter control chamber 80 from supply chamber 78 via conduit 98. As this pressurized fluid fills control chamber 80, a downward force is generated to augment the biasing of spring 104. Diaphragm 30 will thus shift to a generally central position where the sum of the forces acting downwardly on diaphragm assembly 30 are precisely balanced by the forces acting upwardly on diaphragm assembly 30. That is, in the balanced position depicted in FIG. 1, the upward force generated by the pressure in supply chamber 78 against the lower face of diaphragm assembly 30 cancels the sum of the force of spring 104 and the force generated by the pressure in control chamber 80 against the upper face of diaphragm assembly 30. Therefore, only brake line 20, conduits 86 and 98, and chambers 78 and 80 are initially charged to the pressure level of brake pipe 18. FIG. 1 depicts brake control apparatus 10 in a charged and ready condition.

When it is desired to set the brakes on an unloaded railway car, fluid pressure in brake pipe 18 is reduced in the usual manner (typically a staged reduction) by operation of a remote brake valve. The same given pressure drop signal in brake pipe 18 occurs in pressure supply chamber 78 which is joined thereto by conduit 86. This drop in pressure in chamber 78 of control valve 12 upsets the force balance on diaphragm assembly 30, which consequently shifts downward from its generally central position as it seeks to regain a position of equilibrium. As diaphragm assembly 30 shifts downward, it simultaneously translates along the axis of valve stem 48. Valve stem 48 remains stationary as diaphragm assembly 30 slides downwardly therealong because valve 94, which is rigidly attached to valve stem 48, remains firmly seated in plug member 28. However, the downward shift of diaphragm assembly 30 disengagement of valve seat 50 from valve 52. Thus, valve 52 opens in opposition to the biasing force of spring 120 which normally urges valve 52 into seating engagement within diaphragm assembly 30.

Since valve 52 is now open, fluid communication exists between counterbore 44 and control chamber 80 through port 118 of guide 114. Hence the pressure of control chamber 80, which at this time is higher than the pressure in supply chamber 78 after a given pressure drop signal, is present in counterbore 44 as well as cross bores 60 and 62, and conduit 74. Fluid at the pressure of control chamber 80 thus enters chamber 124 of limiting valve 14. Valve 130 is normally held open by the pressure of control chamber 80 acting on the bottom face of piston 128 against the yielding resistance of spring 136.

It is pointed out that valve 130 closes passage 131 only when the pressure in chamber 124 of limiting valve 14 drops to a level which is insufficient to resist the downward force of spring 136. In view of the fact that spring 136 may be preset to a desired compression force by means of adjusting screw 138, it will be understood that valve 14 functions as a safety valve by closing passage 131 when the pressure in control chamber 80 drops below a predetermined level. In other words, limiting valve 14 serves as a safety valve for pressure coming down as opposed to pressure going up. It will also be understood that limiting valve 14 is not essential to the basic operation of brake control apparatus 10. The presence of limiting valve 14 merely adds a desirable safety feature.

Assuming, however, that valve 130 and passageway 131 are open, pressurized fluid flows from chamber 124 into chamber 126 and through passageway 140 to chamber 148 to strut cylinder 16. Since the railway car is unloaded, there is no contact between the end of strut 146 and projecting stop 182 which would unseat valve 162. Other than being pressurized to a level corresponding with the pressure in control chamber 80, and given the fact that chamber 148 is closed at the end of passageway 140, no fluid flows through limiting valve 14 to or through strut cylinder 16. It will be noted that pressure loss due to excessive volume of conduits and chambers are negligible in brake control apparatus 10 when limiting valve 14 and strut cylinder 16 are mounted in close proximity to control valve 12 in accordance with the preferred embodiment of the invention.

Also opening into counterbore 44 of control valve 12 is right cross bore 62, which also senses the pressure of control chamber 80. Check valve 68 separates the other end of cross bore 62 from bore 66 opening onto supply chamber 78. With two unequal pressures acting upon spherical member 70 of check valve 68, the greater pressure of control chamber 80 prevails to unseat spherical member 70 against the yielding resistance of retaining spring 72. As a result, fluid passes from control chamber 80 through port 118, past open valve 52, through bores 44 and 62, around open valve 68 and into supply chamber 78. In this manner, the pressure drops and the pressures in chambers 78 and 80 are equalized. Without a pressure differential to hold valve 68 open, spring 72 closes valve 68 to cut off communication between chambers 78 and 80. Therefore, the brakes on an unloaded railway car are actuated by the identical pressure drop signal through brake line 20 as occurred in brake pipe 18.

When it is desired to release the brakes of an unloaded railway car, operation of the brake valve brings the pressure in brake pipe 18 back up to the pre-brake-application level. The increased pressure in the supply chamber 78 again creates a force imbalance on diaphragm assembly 30 since the pressure in control chamber 80 is now lower than that in supply chamber 78. Check valve 70 is closed and no other fluid communication exists at this moment between chambers 78 and 80. The greater pressure in supply chamber 78 forces diaphragm assembly 30 upward against the yielding resistance of spring 104 and past the generally central position illustrated in FIG. 1 where valve set 50 is brought into contact with valve 52. Valve 52 is thus engaged and pushed upward as is valve stem 48. This upward displacement by diaphragm assembly 30 unseats valve 94, whereby fluid at a greater pressure may pass from supply chamber 78 through bores 92, 90 and 96, and conduit 98 into control chamber 80. Consequently, pressure in control chamber 80 and brake line 20 rises to effect brake release and to move diaphragm assembly 30 back to a position of equilibrium where valves 52 and 90 are closed. Thus, it will be seen that chambers 78 and 80 are once again charged at equal pressures and that brake control apparatus 10 is ready for the next brake application on an unloaded railway car.

When it is desired to set the brakes on a loaded railway car with brake control apparatus 10 shown in FIG. 1, the fluid pressure in brake pipe 18 is reduced in the usual manner (typically a staged reduction) by operation of the brake valve. The same given pressure drop signal in brake pipe 18 occurs in conduit 86 and supply chamber 78. This drop in pressure in chamber 78 of control valve 12 changes the force balance on diaphragm assembly 30, which consequently shifts downward from its generally central position as it seeks to regain a position of equilibrium. As diaphragm assembly 30 shift downward, it simultaneously translates along the axis of valve stem 48. Valve stem 48 remains stationary as diaphragm assembly 30 slides downwardly therealong because valve 94, which is rigidly attached to valve stem 48, remains firmly seated in plug member 28. However, the downward shift of diaphragm assembly 30 causes disengagement of valve seat 50 from valve 52. Thus, valve 52 opens in opposition to the biasing force of spring 120, which normally urges valve 52 into seating engagement within diaphragm assembly 30.

Since valve 52 is now open, fluid communication exists between counterbore 44 and chamber 80 through port 118 of guide 114. Hence, the pressure of control chamber 80, which at this moment is higher than the pressure in supply chamber 78 after a given pressure drop signal, is present in counterbore 44, as well as in cross bores 60 and 62, and conduit 74. Fluid at the pressure of control chamber 80 thus enters chambers 124 of limiting valve 14. With the assumption that there are no breakages or leaks in brake line 20 downstream of control chamber 80, the pressure of chamber 80 acting against the lower face of piston 128 in opposition to spring 136 holds valve 130 away from its valve seat in a disengaged position. Passageway 131 being open, fluid flows from chamber 124 into chamber 126 and through passageway 140 to chamber 148 of strut cylinder 16. Since the railway car is loaded, the sprung and unsprung portions of undercarriage 168 shown in FIGS. 3 and 4 have assumed a closer relative position whereby strut cylinder 16 is brought into contact with projecting stop 182. Consequently, valve stem 146 occupies a slidable position whereby valve 162 is now unseated. Pressurized fluid may thus flow from chamber 148 through bore 152 into chamber 154 and out port 156 to atmosphere. Therefore, fluid at the pressure of control chamber 80 may effectively vent to atmosphere by flowing from chamber 80 past open valve 52 through counterbore 44, cross bore 60, conduit 74, limiting valve 14, choke 142, passageway 140, and strut cylinder 16.

As the pressurized fluid in control chamber 80 vents to atmosphere, the pressure in chamber 80 drops rapidly to a level below that of supply chamber 78. It is pointed out that since the pressure of supply chamber 78 exceeds that of control chamber 80, pressure of chamber 78 in conjunction with the force of retaining spring 72 holds check valve 68 closed against the lower pressure of chamber 80, whereby a pressure dump through cross bore 62, counterbore 44, cross bore 60, and conduit 74 to atmosphere is precluded. Consequently, with a constant pressure existing in supply chamber 78 after the given pressure drop signal in brake pipe 18, and with the pressure dropping in control chamber 80, diaphragm assembly 30 seeks a position of equilibrium. Equilibrium is achieved when the upward force generated by the pressure of supply chamber 78 applied to the lower face of diaphragm assembly 30 balances the downward sum of the force of spring 104 and the force generated by the pressure of control chamber 80 applied to the upper face of diaphragm assembly 30. Since the downward force of spring 104 is constant and the force generated by a pressure is directly proportional to the area over which that pressure is applied, a given pressure drop over a larger area must be balanced by a greater pressure drop over a smaller area. For example, if the ratio of the areas of diaphragm assembly 30 abutting chambers 80 and 78 were 1:2, a pressure drop of two (2) psi in chamber 78 would be equalized by a four (4) psi pressure drop in chamber 80 in conjunction with a constant spring force. It will be understood that the end areas of movable diaphragm assembly 30 abutting chambers 78 and 80 may be selectively sized to produce the desired relative pressure drops between said chambers.

Diaphragm assembly 30 thus moves upward toward a generally central position to close valve 52, thereby halting the decrease of pressure in chamber 80. Note that the pressure in control chamber 80 is prevented from falling below a desired safety level by limiting valve 14 because, the counteracting pressure rendering insufficient opposition, adjustable spring 136 would urge valve 130 to close off communication with atmosphere. Therefore, the pressure drop signal actuating the brakes of a loaded railway car through brake line 20 is larger than that which occurred in brake pipe 18 by the inverse ratio of the areas of diaphragm assembly 30 abutting chambers 80 and 78, respectively.

The brakes on a loaded railway car are released in the same manner as are the brakes of an unloaded railway car. Briefly, operation of a remote brake valve (not shown) brings the pressure in brake pipe 18 up to the pre-brake-application level, which consequent pressure increase in supply chamber 78 forces diaphragm assembly 30 upward against the yielding resistance of spring 104 and the relatively lower pressure of control chamber 80. The upward displacement of diaphragm assembly 30 pulls valve stem 48 upward, unseating valve 94, whereby fluid at greater pressure may pass from supply chamber 78 through bores 92, 90, and 96 and conduit 98 into control chamber 80. Pressure in control chamber 80 and brake line 20 thus rises to effect brake release and to cause diaphragm assembly 30 to move back to a generally central position of equilibrium where valves 94 and 52 are closed. Chambers 78 and 80 being charged to the same pressure, brake control apparatus 10 is ready for the next brake application on a laden railway car.

Figure 2:
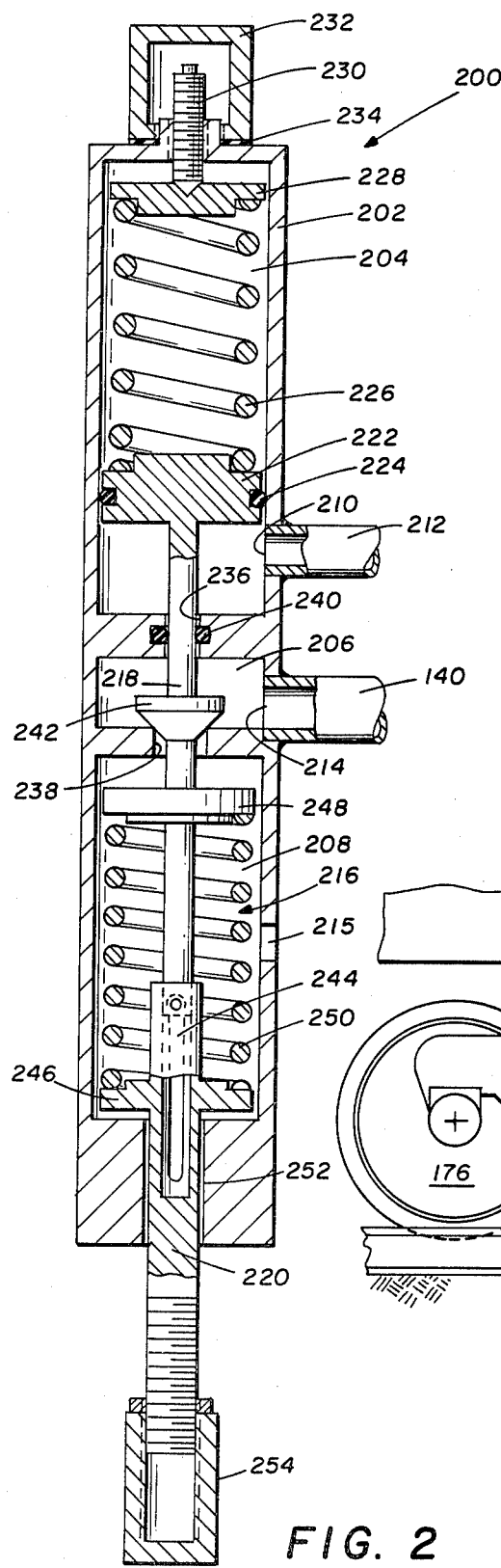
FIG. 2 is an enlarged vertical cross-sectional view of a first modification of the brake control apparatus of FIG. 1.

Referring now to FIG. 2, there is shown a modification of a strut cylinder 16 which may be used with loaded, unloaded or partially loaded railway cars. FIG. 2 shows a strut cylinder 200, which includes a body 202 having an upper chamber 204, a central chamber 206 and a lower chamber 208. A port 210 in the wall of upper chamber 204 unites with conduit 212, which connects to brake line 20 by means of a tee connection (not shown). Fluid communication is consequently established between brake line 20 and chamber 204. A port 214 is also provided in the wall of middle chamber 206. Port 214 connects central chamber 206 with passageway 140 leading to second chamber 126 of limiting valve 14. Lower chamber 208 is constantly open to atmosphere via port 215.

Disposed within strut cylinder 200 and extending through chambers 204, 206 and 208 is valve stem assembly 216, comprising valve stem 218 and strut 220. Piston 222, secured to the upper end of valve stem 218, is slidably disposed within chamber 204. Piston 222 includes a peripheral annular groove having disposed therein O-ring 224. O-ring 224 forms a sliding seal between piston 222 and the interior surface of chamber 204 to confine pressurized fluid beneath the lower face of piston 222. Spring 226 is disposed within the upper portion of chamber 204, between the upper face of the piston 222 and spring follower 228. The spring follower 228 has a depression in its upper surface for receiving and centering spring adjusting screw 230, which is threadedly mounted substantially centrally through the top end of body 202. Thus, by means of spring adjusting screw 230, the downward biasing force of spring 226 against valve stem 218 may be set to a predetermined value and/or adjusted from the outside of strut cylinder 200 without any disassembly thereof.

A jam nut 232 threadedly engages the exterior end of body 202 to cover and protect the protruding end of spring adjusting screw 230. A lock washer 234 is placed between jam nut 232 and the top end of the body 202 to further secure jam nut 232 under conditions of high vibration typically encountered during railway operations.

Valve stem 218 extends downwardly from piston 222 through bore 236, chamber 206 and bore 238 into chamber 208. Bores 236 and 238 are coaxially oriented. O-ring 240, disposed without a peripheral annular groove in bore 236, forms a sliding seal with valve stem 218 thereby preventing fluid communication between the chambers 204 and 206. Valve body 242, intermediately mounted on valve stem 218 within central chamber 206, seats in bore 238 located in the bottom of chamber 206. The position of valve 242 functions to open or close fluid communication between chambers 206 and 208 under certain conditions.

The bottom end of valve stem 218 couples to the upper end of strut 220 within chamber 208. The connection between valve stem 218 and strut 220 is of the lost motion type, such as pin and slot arrangement 244. Spring follower 246 is secured near the upper end of strut 220. Another spring follower 248 is mounted near the lower end of valve stem 218. Placed between srping followers 246 and 248, spring 250 surrounds the connecting ends of valve stem 218 and strut 220. Consequently, valve stem 218 and strut 220 are telescopingly connected with pin and slot arrangement 244 and biased apart by spring 250.

The remaining portion of strut 220 slidably extends through a coaxial bore 252 located in the lower end of body 202. Contact nut 254 engages the reduced and threaded end of strut 220. Accordingly, subject to the amount of extension of strut 220, and thus the position of valve 242, passageway 140 may be either open or closed to atmosphere through chamber 208.

Having reference momentarily to FIGS. 3 and 4 in conjunction with FIG. 2, there is shown a typical location for a strut cylinder 181 which may be similar to strut cylinder 200. Strut cylinder 200 senses the condition of railway car loading in a manner generally analogous to that described hereinbefore. Briefly, strut cylinder 181 is mounted substantially vertically on truck bolster 170, which is a sprung portion of railway undercarriage 168. Stop 182, secured to truck side frame 172, an unsprung portion of the undercarriage, projects substantially horizontally beneath the strut of strut cylinder 181. Therefore, strut cylinder 181 senses the condition of loading in railway car 166 as a function of the relative displacement between the sprung and unsprung portions of railway carriage 169.

When mounted on the railway car undercarriage, strut cylinder 200 is adjusted for operation as follows. Depending upon the setting of contact nut 254, the inward translation of strut 220 causes increased compression within spring 250 tending to open valve 242. The counteracting force of spring 226 is then set by means of adjusting screw 230 so that valve 242 is closed. Thus the position of valve 242 is a function of the interaction of springs 226 and 250, and the pressure within control chamber 80.

The parts of brake control apparatus 10 when strut cylinder 200 rather than strut cylinder 16 is employed as cylinder 181 in FIGS. 3 and 4, function as follows. It will be understood that brake control apparatus 10 incorporating the first modification shown in FIG. 2 functions exactly as was previously described both prior to charging and during charging of the train brake system for operation. FIG. 1 depicts control valve 12 and limiting valve 14 in a charged and ready condition.

The brake set sequence on an unloaded railway car is substantially identical to that which was described above. Briefly, operation of the remote brake valve drops the pressure in brake pipe 18 as well as in supply chamber 78. This drop in pressure in chamber 78 of control valve 12 allows diaphragm assembly 30 to shift downward from its generally central position along the axis of valve stem 48. The downward displacement of diaphragm assembly 30 unseats valve 52, allowing pressurized fluid at a higher pressure from control chamber 80 to enter counterbore 44, cross bores 60 and 62, and conduit 74. However, since the railway car is unloaded, there is no interaction between the end of strut 220 and projecting stop 182 shown in FIGS. 3 and 4 which would unseat valve 242 in strut cylinder 200. Consequently, no pressurized fluid flows through conduit 74, limiting valve 14, passageway 140 or strut cylinder 200 as this pressure discharge route is blocked.

With two unequal pressures acting upon check valve 68, the greater pressure of control chamber 80 prevails to unseat spherical member 70 thereof. Fluid then passes from control chamber 80 through port 118 and past open valves 52 and 68 and into supply chamber 78. In this manner, the pressure differential, and hence the pressures, in chambers 78 and 80 equalize as diaphragm assembly 30 resumes its central position in which valves 52 and 68 are closed.

Since conduit 212 connects chamber 204 of strut cylinder 200 with the brake line 20, chamber 204 experiences a pressure identical to the pressure in chambers 78 and 80 of control valve 12. It will be understood that the downward biasing force of spring 226 was preset to hold valve 242 closed against the upward force generated by the pressure of chamber 204 exerted over the bottom face of piston 222. Therefore, the brakes on an unloaded railway car are actuated by the identical pressure drop signal through brake line 20 as occurred in brake pipe 18.

Setting the brakes on a loaded railway car with a brake control apparatus 10 incorporating strut cylinder 200 also proceeds as was described before. Operation of the brake valve causes a given pressure drop signal in brake pipe 18 as well as supply chamber 78. As a consequence, diaphragm assembly 30 shifts downward from its generally central position seeking to regain a position of equilibrium. The downward displacement of diaphragm assembly 30 unseats valve 52, while valve 94 remains firmly seated. With valve 52 open, fluid at high pressure from control chamber 80 enters bore 44 and passes through conduit 74, limiting valve 14, and passageway 140 into central chamber 206 of strut cylinder 200.

Since railway car 166 is now loaded, the sprung and unsprung portions of undercarriage 168 occupy a closer relative position whereby projecting stop 182 has pushed strut 220 into strut cylinder 200 causing increased compression within spring 250 tending to push valve stem 218 upward, which in turn compresses spring 226. With valve stem 218 and strut 220 thus relatively closer, valve stem assembly 216 occupies a position wherein valve 242 is unseated. Hence, pressurized fluid may flow through passageway 140, past open valve 242 and out port 215 to atmosphere. Therefore, fluid at the pressure of control chamber 80 may effectively vent to atmosphere by flowing from control chamber 80, past open valve 52 through conduit 74, limiting valve 14, passageway 140 and strut cylinder 200.

It will be understood that chamber 204 of strut cylinder 200 experiences the pressure of control chamber 80 through conduit 212 connected to brake line 20. Hence, the pressure in chamber 204 is decreasing and thus rendering less opposition to spring 226. Consequently, valve 242 stays open so long as spring 250 together with the pressure in chamber 204 overcomes spring 226.

As it vents to atmosphere, the pressure in control chamber 80 drops rapidly to a level below that of supply chamber 78. Check valve 68 remains closed as a consequence. Since the force generated by a given pressure drop over a larger area neutralizes the force generated by a greater pressure drop over a smaller area, diaphragm assembly 30 thus moves toward a generally central position to halt the decrease of pressure in chamber 80 by closing valve 52. Note that the pressure in control chamber 80 is prevented from falling below a desired safety level by limiting valve 14, as discussed previously. Therefore, the pressure drop signal actuating the brakes of a fully laden railway car through brake line 20 is larger than that which occurred in brake pipe 18 by the inverse ratio of the areas of diaphragm assembly 30 abutting chambers 80 and 78, respectively.

The primary advantage in using strut cylinder 200 with brake control apparatus 10 is realized when applying brakes to a partially loaded railway car. As usual, operation of the brake valve causes a given pressure drop signal to occur in brake pipe 18 and supply chamber 78. With less pressure now in supply chamber 78, diaphragm assembly 30 shifts downward from its former position of equilibrium, unseating valve 52, while valve 94 remains firmly closed. Pressurized fluid at the still higher pressure of control chamber 80 is allowed to pass open valve 52 into bore 44 and through conduit 74, limiting valve 14 and passageway 140, into chamber 206 of strut cylinder 200. Chamber 204 of strut cylinder 200 is constantly open to brake line 20 via conduit 212; thus, both chambers 204 and 206 of strut cylinder 200 are in fluid communication with chamber 80 of control valve 12.

Since the railway car is only partially loaded, stop 182 pushes strut 220 into body 202 a relatively lesser distance causing increased compression of spring 250 tending to push valve stem 218 upward. Consequently, strut 220 and valve stem 218 assume closer relative positions whereby spring 226 is compressed. The resultant compression of spring 250 exerts an upward force on valve stem 218 which lifts valve 242 from its seat. Accordingly, the pressure in control chamber 80 drops as it vents to atmosphere through passageway 140, bore 238, chamber 208 and port 215 to an initial level corresponding to a loaded railway car. Since chambers 204 and 80 are in fluid communication, pressure simultaneously decreases in chamber 204 resulting in a correspondingly decreasing force component in opposition to spring 226. Thus, the decreased pressure within control chamber 80 eventually renders spring 226 effective to move valve 242 toward a closed position, as if the railway car were unloaded. Were the pressure in control chamber 80 to drop to a predetermined safety level, limiting valve 14 would function as previously described to prevent any further pressure loss. Therefore, the pressure drop signal actuating the brakes of a partially loaded railway car through brake line 20 is initially the brake signal corresponding to a loaded car and finally a relatively smaller brake signal corresponding to an unloaded car. It will be understood that the brake signal response depends upon the degree of partial railway car loading.

The ability of strut cylinder 200 to tailor the braking signal in relation to the extent of railway car loading comprises a significant feature. It is again pointed out that strut cylinder 200 may be scheduled in two ways. First, with spring adjusting screw 230, spring 226 may be preset to close valve 242 when the pressure in control chamber 80 drops to a predetermined level. Second, by means of contact nut 254, the point of engagement with projecting stop 182 may be preset to compensate for the differing empty weights of various type railway cars.

The release of the brakes on a loaded, unloaded or partially loaded railway car proceeds exactly as was described above. Briefly, operation of the remote brake valve brings up the pressure in brake pipe 18 and supply chamber 78, which forces diaphragm assembly 30 upward to unseat valve 94 while holding valve 52 closed. Fluid is thus allowed to enter chamber 80 through conduit 98 until chambers 78 and 80 equalize and valves 94 and 52 are closed in anticipation of the next brake application.

Turning now to FIG. 5, there is shown a brake control apparatus 300 incorporating a second embodiment of the invention. Brake control apparatus 300 comprises a control valve 302, a pressure limiting valve 304 and a strut cylinder 306. Brake control apparatus 300 is interposed between a brake pipe 18 and a brake line 20. Brake pipe 18 runs along the entire train length of railway cars and is connected to a remote source of fluid under pressure (not shown) by means of a brake application valve (not shown). The brake line 20 connects brake control apparatus 300 with a conventional brake cylinder (not shown).

Control valve 302 is of sectionalized casing construction, consisting of an upper casing section 308, an intermediate casing section 310 and a lower casing section 312. Casing sections 308, 310 and 312 and secured together. Plug member 314 is threadedly engaged through the top end of upper casing section 308.

Disposed within control valve 302 is diaphragm assembly 316. Diaphragm assembly 316 includes a spaced pair of diaphragms 318 and 320. The outer periphery of first diaphragm 318 is clamped between the lower face of intermediate casing section 310 and the upper face of lower casing section 312. Similarly, the outer periphery of second diaphragm 320 is clamped between the lower face of upper casing section 308 and the upper face of intermediate casing section 310.

The inner peripheries of diaphragms 318 and 320 are secured within diaphragm assembly 316. The inner periphery of first diaphragm 318 is clamped between the lower face of diaphragm follower 322 and the upper face of lower diaphragm nut 324, which threadedly engages a downwardly protruding threaded portion of diaphragm follower 322. In a similar manner, the upper face of diaphragm follower 322 includes an upwardly protruding threaded portion threadedly engaged by upper diaphragm nut 326 to securely clamp the inner periphery of second diaphragm 320 therebetween. Thus, it will be seen that diaphragms 318 and 320 flexibly suspend diaphragm assembly 316 for limited axial translation within the sloped annular space 325 between diaphragm assembly 316 and intermediate casing section 310.

Diaphragm follower 322 includes coaxial bore 328. Bore 328 extends through diaphragm follower 322, between the protruding end portions thereof. The top end of bore 328 unites with counterbore 330 of upper diaphragm nut 326. Diaphragm nut 326 further includes bore 332 positioned intermediate first counterbore 330 and second counterbore 334. Consequently, there is a passage through diaphragm assembly 316 made up of coaxial bores and counterbores.

By virtue of its placement within control valve 302, diaphragm assembly 316 separates the interior volume thereof into two chambers, 336 and 338. Pressure supply chamber 336 is defined as that volume between the lower surface of diaphragm assembly 316, and casing section 312. The effective area of diaphragm assembly 316 abutting pressure supply chamber 336 is thus the area across the mouth of casing section 312. Coil spring 340 is disposed within chamber 336 intermediate lower diaphragm nut 324 and spring follower 342. The spring follower 342 has a depression in its bottom surface for receiving and centering spring adjusting screw 344, which is threadedly mounted substantially centrally through lower casing section 312. Thus, by means of spring adjusting screw 344, the upward spring bias against diaphragm assembly 316 may be set to a predetermined value and/or adjusted from the outside of control valve 302 without disassembly thereof. A protective jam nut 346 threadedly engages the exterior protruding end of spring adjusting screw 344 to lock it in any desired position. Gasket 348, placed between jam nut 346 and the exterior of casing section 312, forms a seal to prevent pressure leakage from supply chamber 336. Located in the wall of lower casing section 312, port 350 connects supply chamber 336 with conduit 352, leading to brake pipe 18. Consequently, fluid communication exists between pressure supply chamber 336 and brake pipe 18.

On the other side of diaphragm assembly 316, control chamber 338 is defined by the upper surface of diaphragm assembly 316, in conjunction with upper casing section 308 and plug member 314. It is pointed out that the effective area of the upper end of diaphragm assembly 316 abutting control chamber 338, due to the enlarged mouth of casing section 308, exceeds the effective area of the other end of diaphragm assembly 316 which abuts supply chamber 336. Port 354 located in the wall of casing section 308 provides direct fluid communication between control chamber 338 and a brake cylinder (not shown) by means of brake line 20.

Plug member 314 includes a bore 356 positioned between and coaxial with counterbores 358 and 360. Upper counterbore 358 includes a port 362, to which is connected conduit 364 leading to pressure accumulator 366. Line 368, connected between conduit 364 and brake line 20, includes a check valve 370, which in its simplest form may consist of a spherical valve member confined by a transverse pin and a choked passageway in line 368.

Valve assembly 372 is disposed within control chamber 338 between plug member 314 and upper diaphragm nut 326. Valve assembly 372 includes a valve stem 374. The lower end of valve stem 374 has a rigid valve body 376 which seats on bore 332 in diaphragm nut 326. The upper end of valve stem 374 is flexibly coupled to valve body 378 to allow limited axial translation therebetween. Valve body 378 is positioned in counterbore 358 for seating engagement with one end of bore 356 in plug member 314. Spring 380, which surrounds valve stem 374 between a collar thereon and plug member 314, urges valves 376 and 378 into seated engagement with bores 332 and 356, respectively. In addition, port 382 in the wall of upper diaphragm nut 326 allows for constant fluid communication between the interior thereof and control chamber 338.

A second check valve 384, which may comprise in its simplest form a spherical valve member positioned between a transverse pin and a choked passage, is positioned in line 386. Line 386 is connected between brake line 20 and conduit 352. By means of conduits 388 and 390, which tee into line 386 on opposite sides of check valve 384, limiting valve 304 and strut cylinder 306 are connected in parallel across check valve 384.

Limiting valve 304 includes a body 392 defining first and second chambers 394 and 396. First chamber 394 connects to the brake pipe side of check valve 384, while second chamber 396 connects to the brake cylinder line of check valve 384. Choke 398 functions to restrict the rate of fluid flow between chamber 396 and conduit 386.

Piston 400, slidably positioned within first chamber 394, has a peripheral annular groove in which is disposed an O-ring 402. O-ring 402 forms a sliding seal between piston 400 and the interior surface of body 392 so as to prevent leakage of fluid under pressure between the left and right portions of first chamber 394. Positioned in the right portion of chamber 394, intermediate the top of piston 400 and spring follower 404, is spring 406. Spring 406 is biased to counteract the force generated by the pressure in the left portion of chamber 394 acting against the bottom face of piston 400. The force exerted by spring 406 may be preset or adjusted by means of spring adjusting screw 408. Spring adjusting screw 408 is threadedly mounted between the opposite end of body 392 and contacts spring follower 494. Consequently, it will be understood that conduit 388 may fluidly communicate with conduit 390 through chambers 394 and 396 subject to the action of valve 395.

Strut cylinder 306 includes a body 410 in which is disposed an extending strut 412. The body 410 includes a top chamber 414 separated from bottom chamber 416 by bore 418. Conduits 388 and 390 are ported, respectively, to chambers 414 and 416 of strut cylinder 306. Lower bore 420, which is coaxial with bore 418, slidably engages and guides strut 412 for translation. An O-ring 422 is provided within a peripheral annular groove of bore 420 to form a sliding seal with strut 412 so as to prevent leakage of pressurized fluid from chamber 416. The bottom end of strut 412 is reduced and threaded to receive contact nut 424. Valve body 426, attached near the top of strut 412, is located in top chamber 414. A spring 428, between the end of chamber 414 and valve body 426, urges strut 412 downwardly. Preferably, contact nut 424 should be adjusted so that valve 426 is open when the car is loaded at between 40% and 60% capacity. Accordingly, subject to the position of strut 412 and thus valve 426, fluid communication may exist between chambers 414 and 416.

The parts of brake control apparatus 300 illustrated in FIG. 5 and so far described function as follows. It will be understood that brake control apparatus 300 functions both prior to charging and during charging of the train brake system for operation as previously described with regard to brake control apparatus 10. FIG. 5 depicts control valve 302 and limiting valve 304 in a charged and ready condition.

When it is desired to set the brakes on an unloaded railway car using brake control apparatus 300, the pressure in brake pipe 18 is reduced in the usual manner (typically a staged reduction) by operation of the brake valve. The same pressure decrease is also experienced in conduits 352 and 390, as well as in supply chamber 336 of control valve 302. Since the railway car is unloaded, the sprung and unsprung portions of undercarriage 168 shown in FIG. 4 do not occupy a closer relative position which would cause stop 182 to interact with strut 412 of strut cylinder 306. Strut 412 is thus fully extended closing valve 426 as shown in FIG. 5. Consequently, there is no fluid communication through strut cylinder 306. Additionally since during a service brake application, a relatively small pressure drop occurs in the brake pipe in comparison to the drop in brake pipe pressure during an emergency brake application, valve 395 of limiting valve 304 remains closed. Check valve 384, under the pressure differential existing between brake line 20 and brake pipe 18, is also closed. Consequently, no pressurized fluid flows through check valve 384, limiting valve 304 or strut cylinder 306.

The pressure reduction in supply chamber 336 upsets the force balance on diaphragm assembly 316, which shifts downward as it seeks to regain a position of equilibrium. The downward shift of diaphragm assembly 316 unseats valve 376, while valve 378 remains closed. Thus, there is direct fluid communication between supply chamber 336 through bore 328, counterbore 330, bore 332 and counterbore 334 into control chamber 338. With fluid escaping from chamber 338 to chamber 336, the pressure in control chamber 338 drops rapidly toward that of supply chamber 336. Note that valve 378 stays closed biased by spring 380, while the spherical member of check valve 370 is seated due to a pressure differential across it. Therefore, the greater pressure stored in accumulator 366 is disconnected from brake control apparatus 300 at this time.

As the pressure in control chamber 338 drops, the downward force generated thereby also decreases allowing diaphragm assembly 316 to start upward. Diaphragm assembly 316 moves upward toward a position of equilibrium gradually closing valve 376. Equilibrium is achieved when the downward force generated by the pressure of control chamber 338, applied to the upper diaphragm assembly 316, balances the upward sum of the force of spring 340 and the force generated by the pressure of supply chamber 336 applied to the lower face of diaphragm assembly 316. Since the upward force of spring 340 is constant and the force generated by a pressure is directly proportional to the area over which that pressure is applied, a given pressure drop over a larger area must be balanced by a greater pressure drop over a smaller area. For example, if the ratio of the areas of diaphragm assembly 316 abutting chambers 336 and 338 were 1:2, a pressure drop of four (4) psi in chamber 336 in conjunction with a constant spring force would be equalized by a two (2) psi pressure drop in chamber 338. The end areas of movable diaphragm assembly 316 abutting chambers 336 and 338 may be selectively sized to proportion the relative pressure drops between said chambers as desired. Consequently, diaphragm assembly 316 moves upward, closing valve 376 and halting the decrease of pressure in control chamber 338. Therefore, the pressure drop signal actuating the brakes of an unloaded railway car through brake line 20 is smaller than that which occurred in brake pipe 18 by the inverse ratio of the areas of diaphragm assembly 316 abutting chambers 338 and 336, respectively.

Note that should the given pressure drop signal in brake pipe 18 exceed a predetermined limit, such as during an emergency brake application, spring 406 of limiting valve 304 would be rendered effective to open normally closed valve 395. Consequently, limiting valve 304 serves as an optical safety device to bypass control valve 302, applying the brakes of an unloaded railway car with the greater pressure reduction of brake pipe 18 under emergency conditions. Adjustment of spring adjusting screw 408 schedules limiting valve 304.

When it is desired to release the brakes of an unloaded railway car, operation of the brake valve brings the pressure in the brake pipe 18 up. The increase in the pressure in supply chamber 336 and the force of spring 340 again creates a force imbalance on diaphragm assembly 316. Diaphragm assembly 316 moves upward against the nominal yielding resistance of spring 380 to engage and close valve 376. The upward displacement of diaphragm assembly 316 overrides the lost motion connection between valve 378 and valve stem 374 to open valve 378 allowing fluid communication with pressure accumulator 366. Consequently, pressure in control chamber 338 and brake line 20 rises to effect brake release and to move diaphragm assembly 316 back to a position of equilibrium where valves 376 and 378 are closed. However, due to the different surface areas of diaphragm assembly 316 abutting chambers 336 and 338, the rate of pressure rise in brake line 20 is less than that in brake pipe 18. For example, if the ratio of the areas of diaphragm assembly 316 abutting chambers 336 and 338 were 1:2, the pressure rise in brake line 20 would take place at one-half the rate of pressure rise in brake pipe 18. It will be understood that the pressure in accumulator 366 never falls below the pressure in brake supply line 18, since check valves 370 and 384 would open to allow brake pipe 18 to recharge accumulator 366. Pressure accumulator 366 should be of sufficiently large volume so that the pressure drain or draw-down experienced to release the brakes does not exceed some nominal value, two (2) psi for instance, thereby substantially preserving the pressure reservoir therein. Therefore, it will be seen that chambers 336 and 338 are once again charged at equal pressures and that brake control apparatus 300 is ready for the next brake application on an unladen railway car.

When it is desired to set the brakes on a loaded railway car with brake control apparatus 300, the pressure in brake pipe 18 is reduced in the usual manner (typically a staged reduction) by operation of the brake valve. The same pressure decrease is also experienced in conduits 352 and 390, as well as in supply chamber 336 of control valve 302. However, since the railway car is loaded, the sprung and unsprung portions of undercarriage 168 shown in FIGS. 3 and 4 occupy a closer relative position causing stop 182 to contact strut 412 and thus open valve 426 of strut cylinder 306. Consequently, a direct line of communication exists from conduit 390 through strut cylinder 306 to conduits 388 and 386. Therefore, the pressure drop signal actuating the brakes of a loaded railway car through brake line 20 is identical to that which occurred in brake pipe 18.

With regard to releasing the brakes on a loaded railway car, there being a direct open circuit between brake pipe 18 and brake line 20, operation of a remote brake valve (not shown) brings up the pressure simultaneously in brake pipe 18 and brake line 20. Brake release is thus effected, and brake control apparatus 300 is ready for the next brake application on a laden railway car.

Referring now to FIG. 6, there is shown a modification of strut cylinder 306 which may be used with unloaded, loaded or partially loaded railway cars. FIG. 6 shows a strut cylinder 450, which includes a body 452 having an upper chamber 454, a central chamber 456 and a lower chamber 458. A port 460 in the wall of central chamber 456 unites with conduit 388, while port 462 in the wall of chamber 458 unites with conduit 390.

Disposed within strut cylinder 450 and extending through chambers 454, 456 and 458 is valve stem assembly 464, comprising valve stem 466 and strut 468. Piston 470, secured to the upper end of valve stem 466, is slidably disposed within chamber 454. Piston 470 includes a peripheral annular groove having disposed therein O-ring 472. O-ring 472 forms a sliding seal between piston 470 and the interior surface of chamber 454 to confine pressurized fluid beneath the lower face of piston 470. Spring 474 is disposed within the upper portion of chamber 454, between the upper face of the piston 470 and spring follower 476. Spring follower 476 includes a depression in its upper surface for receiving and centering spring adjusting screw 478, which is threadedly mounted substantially centrally through the top end of body 452. Thus, by means of spring adjusting screw 478, the downward biasing force of spring 474 against valve stem 466 may be set to a predetermined value and/or adjusted from the outside of strut cylinder 450 without any disassembly thereof. A jam nut 480 threadedly engages the exterior end of body 452 to cover and protect in protruding end of spring adjusting screw 478. A lock washer 482 may be placed between jam nut 480 and the top end of body 452 to further secure jam nut 480 under conditions of high vibration typically encountered during railway operations.

Valve stem 466 extends downwardly from piston 470 through bore 484, chamber 456 and bore 486 into chamber 458. Opening 488 also connects chambers 454 and 456. Bores 484 and 486 are coaxially oriented. Valve body 490, intermediately mounted on valve stem 466 within central chamber 456, seats in bore 486 located in the bottom of chamber 456. The position of valve 490 functions to open or close fluid communication between chambers 456 and 458 under certain conditions.

The bottom end of valve stem 466 couples to the upper end of strut 468 within chamber 458. The connection between valve stem 466 and strut 468 is of the lost motion type, such as pin and slot arrangement 492. Spring follower 494 is secured near the upper end of strut 468. Another spring follower 496 is mounted near the lower end of valve stem 466. Placed between spring followers 494 and 496, spring 498 surrounds the connecting ends of valve stem 466 and strut 468. Consequently, valve stem 466 and strut 468 are telescopingly connected with pin and slot arrangement 492 and biased apart by spring 498.

The remaining portion of strut 468 slidably extends through coaxial bore 500 located in the lower end of the body 452. O-ring 502, disposed within a peripheral annular groove in bore 500, forms a sliding seal with strut 468 to prevent pressure leakage from strut cylinder 450. Contact nut 504 engages the reduced and threaded end of strut 468. Accordingly, subject to the amount of extension of strut 468, and thus the position of valve 490, conduits 388 and 390 may or may not be in fluid communication.

It will be understood that strut cylinder 450 senses the condition of railway car loading in a manner similar to that of strut cylinder 200, which was earlier discussed. When used with strut cylinder 450, brake control apparatus 300 is adjusted for operation as follows. Depending upon the setting of contact nut 504, the inward translation of strut 468 causes increased compression within spring 498, tending to open valve 490. The counteracting force of spring 474 is then set by means of adjusting screw 478 so that valve 490 is closed. Thus, the position of valve 490 is a function of the interaction of springs 474 and 498, and the pressures within control chamber 338 and supply chamber 336. It will be understood that brake control apparatus 300 incorporating the modification shown in FIG. 6 functions similarly to that previously described both prior to charging and during charging of the train brake system for operation. FIG. 5 depicts control valve 302 and limiting valve 304 in a charged and ready condition.

The brake set sequence on an unloaded railway car is substantially similar to that which was described above. Briefly, operation of the brake valve drops the pressure in brake pipe 18, conduits 352 and 390, as well as in supply chamber 336 of control valve 302. Since the railway car is unloaded, the sprung and unsprung portions of undercarriage 168 do not occupy a closer relative position causing stop 182 to contact strut 468 of strut cylinder 450. Strut 468 is thus fully extended, closing valve 490 as shown in FIG. 6. Consequently, there is no fluid communication through check valve 384, limiting valve 304, nor through strut cylinder 450. With a pressure supply chamber 336 now lower than pressure in control chamber 338, diaphragm assembly 316 shifts downward, opening valve 376. With direct fluid communication between chambers 336 and 338, the pressure in control chamber 338 drops rapidly toward that of supply chamber 336. Since the force generated by a smaller pressure drop over a larger area neutralizes the force generated by a given pressure drop over a smaller area, diaphragm assembly 316 thus moves upward to close valve 376, halt the decrease of pressure in chamber 338, and resume a position of equilibrium. Therefore, the pressure drop signal actuating the brakes of an unloaded railway car through brake line 20 is smaller that that which occurred in brake pipe 18 by the inverse ratio of the areas of diaphragm assembly 316 abutting chambers 338 and 336, respectively.

Setting the brakes on a loaded railway car with strut cylinder 450 in brake control apparatus 300 also proceeds as was described before. Briefly, operation of the brake valve causes a given pressure reduction in brake pipe 18, conduits 352 and 390, as well as in supply chamber 336 of control valve 302. Since the railway car is loaded, the sprung and unsprung portions of undercarriage 168, shown in FIGS. 3 and 4, occupy a closer relative position whereby projecting stop 182 has pushed strut 468 into strut cylinder 450, causing increased compression within spring 498 tending to push valve stem 466 upward, which in turn compresses spring 474. It will be appreciated that when the railway car is fully loaded, spring 498 is compressed to an extent sufficient to overcome spring 474 independently of the pressure in chamber 454. Of course, at this point the pressure in control chamber 338 and thus chamber 454 is decreasing and rendering less opposition to spring 474. With valve stem 466 and strut 468 thus relatively closer, valve stem assembly 464 is so positioned that valve 490 is unseated. With open fluid communication between conduits 388 and 390, the fluid follows the path of least resistance so that the pressure drop signal actuating the brakes of a fully loaded railway car through brake line 20 is identical to the pressure drop signal in brake pipe 18.

The primary advantage in using strut cylinder 450 with brake control apparatus 300 is evident when applying brakes to a partially loaded car. As usual, operation of the brake valve causes a given pressure drop to occur in brake pipe 18, conduits 352 and 390 and supply chamber 336 of control valve 302. Less pressure now present in supply chamber 336, diaphragm assembly 316 shifts downward from its former position of equilibrium, unseating valve 376. With direct fluid communication between chambers 336 and 338, the pressure in control chamber 338 begins decreasing.

Since the railway car is only partially loaded, stop 182 pushes strut 468 into body 452 a relatively lesser distance, causing increased compression of spring 498, tending to push valve stem 466 upward. Consequently, strut 468 and valve stem 466 assume closer relative positions whereby spring 474 is compressed. Note, however, that the resulting compression of spring 498 exerts an upward force on valve stem 466 which partially lifts valve 490 from its seat. Accordingly, initial fluid communication exists between conduits 388 and 390 through chambers 456 and 458 of strut cylinder 450 as if the railway car were fully loaded. Since chamber 454 fluidly communicates with control chamber 338 via chamber 456, conduits 388 and 386 and brake line 20, pressure simultaneously decrease in chamber 454. Consequently, the decreasing pressure of control chamber 338 in control valve 302 eventually renders spring 474 of strut cylinder 450 effective to move valve 490 toward a closed position, as though the railway car were unloaded. Note that were the pressure in brake pipe 18 to drop to a predetermined emergency level, limiting valve 304 would function as previously described to apply the full brake pipe pressure drop regardless of the degree of loading in the railway car with strut cylinder 450. Therefore, the pressure drop signal actuating the brakes of a partially laden railway car through a brake line 20 in initially the brake signal corresponding to a loaded car and finally a relatively smaller brake signal corresponding to an unloaded car.

The ability of strut cylinder 450 to tailor the braking signal in relation to the extent of railway car loading comprises a significant advantage. It is again pointed out that strut cylinder 450 may be scheduled in two ways. First, with spring adjusting screw 478, spring 474 may be preset to close valve 490 when the pressure in control chamber 338 drops to a predetermined level. Second, by means of contact nut 504, the point of engagement with projecting stop 182 may be preset to compensate for various empty weights of various type railway cars.

The release of the brakes on a loaded, unloaded or partially loaded railway car proceeds exactly as was described before. Briefly, operation of the brake valve increases the pressure in brake pipe 18, conduit 352 and 390, and supply chamber 336. Check valve 384 experiences a pressure differential and opens to allow fluid at the higher pressure of supply chamber 336 to enter control chamber 338 by means of lines 386 and 20. Simultaneously, diaphragm assembly 316 moves upward to close valve 376, whereby the pressures in chambers 336 and 338 equalize in anticipation of the next brake application.

If desired, strut cylinder 450 together with check valve 384 can be connected between brake pipe 18 and brake line 20 without utilizing control valve 302. Preferably, limiting valve 304 is used with check valve 384 and strut cylinder 450.

Thus, it is apparent that there has been provided in accordance with the invention a brake control apparatus for railway cars that fully satisfies the objects and advantages set forth above. While the invention has been described in conjunction with specific embodiments and modifications thereof, it is evident that many other alternatives, modifications and variations will be apparent to those skilled in the art in view of the foregoing description. Accordingly, it is intended to embrace all such alternatives, modifications and variations as fall within the spirit and scope of the invention.

What is claimed is:

1. A method of controlling the pressure drop transmitted from a pressurized train brake pressure supply line with a brake valve therein to a pressurized brake cylinder line of a railway car with sprung and unsprung portions, comprising the steps of:
   (a) connecting a first chamber to the brake pressure supply line;
   (b) connecting a second chamber to the brake cylinder line;
   (c) movably abutting the first and second chambers with diaphragm means having surfaces of different areas, with the relatively larger are abutting the second chamber;
   (d) interconnecting the first and second chambers with a first valve means responsive to the relative positioning of the sprung and unsprung portions of the railway car, which positioning corresponds to the loading condition, to permit fluid flow between the first and second chambers when the railway car is loaded so that the brake cylinder line experiences a pressure drop substantially equal to that in the brake pressure supply line;
   (e) providing a second valve means responsive to predetermined positioning of the diaphragm means to permit fluid flow between the first and second chambers while the first valve means is closed and the diaphragm means is unbalanced so that the brake cylinder line on an unloaded railway car experiences a pressure drop relatively smaller than that experienced in the brake pressure supply line by the inverse ratio of surface areas of the diaphragm means abutting the second and first chambers, respectively; and
   (f) interconnecting the first and second chambers with a first check valve means responsive to pressure differential for equalization upon a pressure rise in the brake pressure supply line so that the railway car brakes can be released.

2. The method of claim 1 including the step of:
connecting across the first valve means a normally closed safety valve which opens responsive to a predetermined pressure drop in the brake pressure supply line to permit direct fluid communication between the brake pressure supply and brake cylinder lines.

3. The method of claim 1 including the steps of:
applying to the first valve means a variable bias urging said first valve means closed, said variable bias comprising the difference between the pressure in the brake cylinder line and an opposing predetermined bias; and applying to the first valve means a bias urging the first valve means open, said opening bias comprising the difference between the pressure in the brake pressure supply line and a variable bias proportional to the extent of railway car loading, so that the brake cylinder line on a partially loaded railway car initially experiences a pressure drop equal to that for a fully loaded railway car, but which finally experiences a pressure drop equal to that for an unloaded railway car.

* * * * *